United States Patent
Brown et al.

(10) Patent No.: US 9,983,815 B1
(45) Date of Patent: May 29, 2018

(54) USING A CASCADE FLAG TO PROCESS A COPY RELATIONSHIP HAVING A BACKWARD CASCADE COPY RELATIONSHIP

(71) Applicant: INTERNATIONAL BUSINESS MACHINES CORPORATION, Armonk, NY (US)

(72) Inventors: Theresa M. Brown, Tucson, AZ (US); Nedlaya Y. Francisco, Tucson, AZ (US); Suguang Li, Tucson, AZ (US); Mark L. Lipets, Tucson, AZ (US); Gregory E. McBride, Vail, AZ (US); Carol S. Mellgren, Tucson, AZ (US); Raul E. Saba, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/372,192

(22) Filed: Dec. 7, 2016

(51) Int. Cl.
G06F 12/00 (2006.01)
G06F 3/06 (2006.01)
G06F 11/14 (2006.01)

(52) U.S. Cl.
CPC .......... *G06F 3/0619* (2013.01); *G06F 3/065* (2013.01); *G06F 3/0646* (2013.01); *G06F 3/0647* (2013.01); *G06F 3/0683* (2013.01); *G06F 11/1446* (2013.01); *G06F 11/1448* (2013.01); *G06F 11/1458* (2013.01); *G06F 11/1469* (2013.01)

(58) Field of Classification Search
CPC ...... G06F 3/0619; G06F 3/065; G06F 3/0683; G06F 3/0646; G06F 3/0647; G06F 11/1446; G06F 11/1448; G06F 11/1458; G06F 11/1469
See application file for complete search history.

(56) References Cited

U.S. PATENT DOCUMENTS 7,461,100 B2   12/2008   Spear et al.
8,285,679 B2   10/2012   Agombar et al.
(Continued)

OTHER PUBLICATIONS

C. Burger, et al., "IBM System Storage DS8000 Series: IBM FlashCopy SE", IBM Corporation, Red Paper Document REDP-4368-00, Feb. 2008, pp. 80.
(Continued)

*Primary Examiner* — Shawn X Gu
(74) *Attorney, Agent, or Firm* — David W. Victor; Kondrad Raynes Davda & Victor LLP (57) ABSTRACT

Provided are a computer program product, system, and method for using a cascade flag to process a copy relationship having a backward cascade copy relationship. Each of a plurality of copy relationships indicates to copy source data to target data and has a cascade flag. The cascade flag for a forward copy relationship of the copy relationships is set to a first value in response to determining that the source data for the forward copy relationship comprises target data for a backward copy relationship and that a background copy operation specified to copy source data to target data of the backward copy relationship has not completed. The cascade flag for the forward copy relationship is set to a second value in response to determining that the backward copy relationship does not have an uncompleted background copy operation.

23 Claims, 7 Drawing Sheets

(56) References Cited

U.S. PATENT DOCUMENTS

| | | |
|---|---|---|
| 8,555,010 B2 | 10/2013 | Yuhara et al. |
| 8,606,767 B2 | 12/2013 | Brown et al. |
| 8,706,999 B2 | 4/2014 | Agombar et al. |
| 9,075,723 B2 | 7/2015 | Benhase et al. |
| 9,086,818 B2 | 7/2015 | Benhase et al. |
| 2007/0198790 A1* | 8/2007 | Asano .................. G06F 3/0605 711/162 |
| 2014/0208051 A1 | 7/2014 | Agombar et al. |
| 2015/0143168 A1 | 5/2015 | Beeken |
| 2015/0286429 A1 | 10/2015 | Dain et al. |

OTHER PUBLICATIONS

B. Dufrasne, et al., "DS8000 Thin Provisioning", IBM Corporation, Red Paper Document REDP-4554-01, Jul. 2014, pp. 122.

"FlashCopy mappings", [online][retrieved Nov. 26, 2016] http://publib.boulder.ibm.com/infocenter/flexsys/information/topic/com . . . , pp. 5.

"DFSMS Advanced Copy Services", IBM Corporation, Document No. SC35-0428-19, 2011, pp. 814.

J. Tate, et al., "IBM System Storage SAN Volume Controllerand Storwize V7000 Replication Family Services", IBM Corporation, Document No. SG24-7574-02, Mar. 2013, pp. 538.

"Incremental FlaschCopy", IBM Corporation, [online][retrieved Nov. 23, 2016] http://www.ibm.com/support/knowledgecenter/SSLTBW_2.1.0/com.ibm.z . . . , pp. 3.

U.S. Appl. No. 15/372,154, filed Dec. 7, 2016.
U.S. Appl. No. 15/372,163, filed Dec. 7, 2016.

* cited by examiner

USING A CASCADE FLAG TO PROCESS A COPY RELATIONSHIP HAVING A BACKWARD CASCADE COPY RELATIONSHIP

BACKGROUND OF THE INVENTION

1. Field of the Invention

The present invention relates to a computer program product, system, and method for using a cascade flag to process a copy relationship having a backward cascade copy relationship.

2. Description of the Related Art

In a storage environment, a storage controller may create point-in-time ("PiT") copies of a production volume using point-in-time copy techniques, such as the IBM Flash-Copy® (FlashCopy is a registered trademark of IBM), snapshot, etc. A point-in-time copy replicates data in a manner that appears instantaneous and allows a host to continue accessing the source volume while actual data transfers to the copy volume are deferred to a later time. The point-in-time copy appears instantaneous because Input/Output ("I/O") complete is returned to the copy operation in response to generating the relationship data structures without copying the data from the source to the target volumes. Point-in-time copy techniques typically defer the transfer of the data in the source volume at the time the point-in-time copy relationship was established to the copy target volume until a write operation is requested to that data block on the source volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the copy volume. The point-in-time copy comprises the combination of the data in the source volume and the data to be overwritten by the updates transferred to the target volume.

With cascaded copy relationship, a source volume in one point-in-time copy relationship, such as a FlashCopy®, may comprise target data of another copy relationship. A backward cascade copy relationship comprises a copy relationship whose target data is the source data in a forward copy relationship. There may be a chain of multiple backward cascade copy relationships. If a request is directed to a track in a volume in one of the cascaded copy relationship, where the source and target volumes for each copy relationship are managed by different servers, then the requested data may be located at any of the servers in the cascaded copy relationships. A server receiving a request to a track in a cascaded copy relationship may have to send messages to the different servers in the cascaded copy relationships to determine where the data is located to retrieve.

There is a need in the art for improved techniques for managing cascaded copy relationships.

SUMMARY

Provided are a computer program product, system, and method for using a cascade flag to process a copy relationship having a backward cascade copy relationship. Each of a plurality of copy relationships indicates to copy source data to target data and has a cascade flag. The cascade flag for a forward copy relationship of the copy relationships is set to a first value in response to determining that the source data for the forward copy relationship comprises target data for a backward copy relationship and that a background copy operation specified to copy source data to target data of the backward copy relationship has not completed. The cascade flag for the forward copy relationship is set to a second value in response to determining that the backward copy relationship does not have an uncompleted background copy operation.

DETAILED DESCRIPTION

In a cascaded copy relationship, e.g., A to B, B to C, C to D, the target volume of one copy relationship comprises the source volume of another and each volume is at a different server, except for the volumes that comprise both source and target data of different copy relationship, which would be at the same server. Because of the cascaded relationships, a forward copy relationship would not have the current data in the cascade if a backward copy relationship has not completed its background copy operation to copy the source data to the target data, which would then be propagated through the cascaded copy relationships.

In such cascaded copy relationships, a copy manager in one server processing a request to a data unit in one of the volumes in the cascaded copy relationships may need to read information from multiple of the servers in the cascade to determine the server in the cascade at which the current data is maintained including whether data has been copied over from a backward cascade copy relationship to the source data of the copy relationship being considered.

Described embodiments optimize cascaded copy relationship processing by maintaining a cascade flag for each of the copy relationships to indicate whether there is a pending background copy operation for a backward copy relationship whose target data is the source data of the copy relationship being considered. The use of the cascade flag would indicate in the current copy relationship whether the source data has the current data copied over from one or more prior backward copy relationships. The use of the cascade flag avoids the need to message one of the servers in the backward copy relationship to determine whether a background copy operation completed and that that the source data in the forward copy relationship would have current data.

Further, the cascade flag may be used to determine when to initiate a background copy operation in one of the copy relationships in the cascade by only initiating the background copy operation after all the backward cascade copy relationships have completed their background copy operation to propagate the source data through the cascaded copy relationships.

Figure 1:
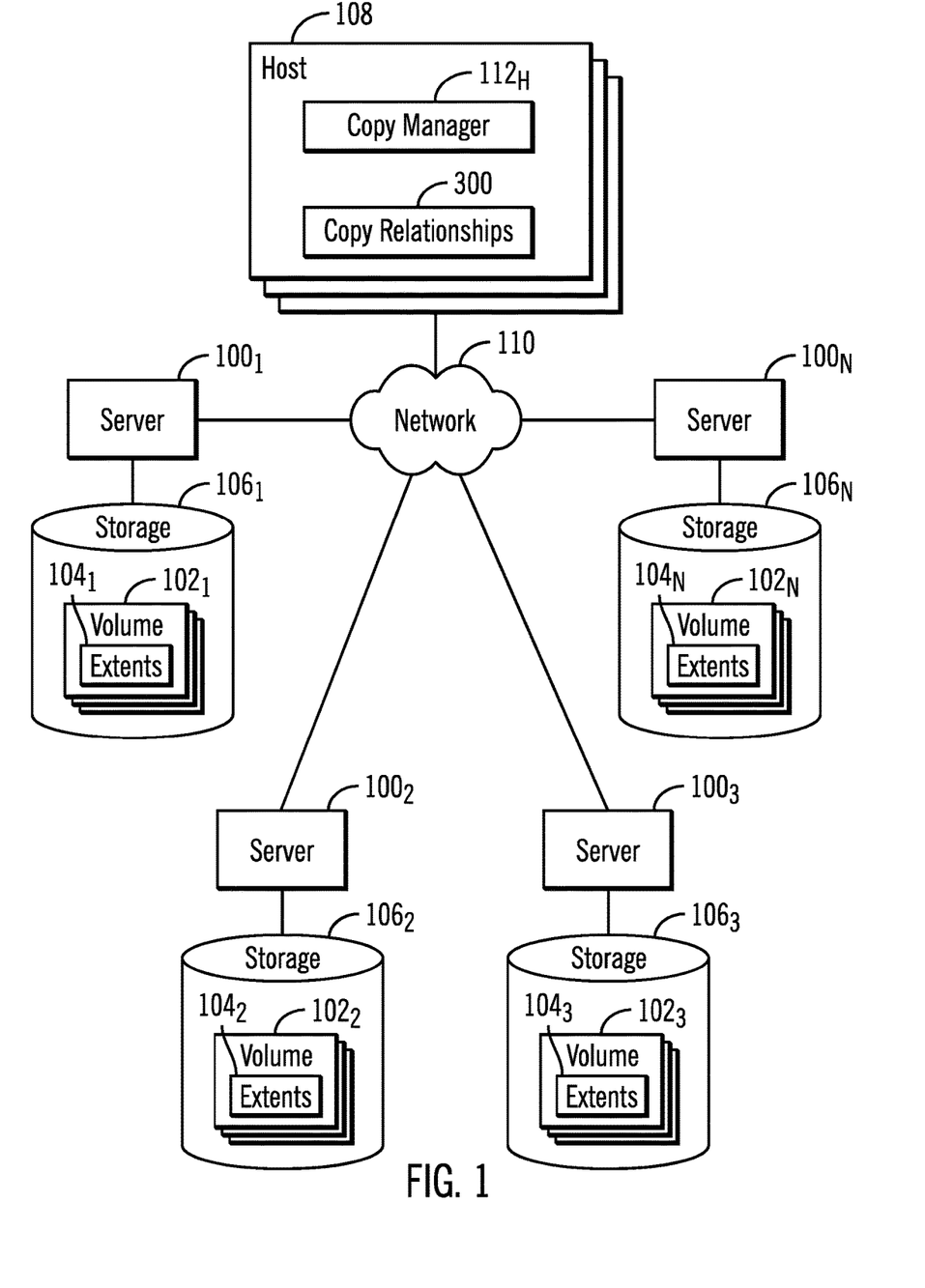
FIG. 1 illustrates an embodiment of a storage environment.

FIG. 1 illustrates an embodiment of a data storage environment having a plurality of servers $100_1$, $100_2$, $100_3$ . . . $100_N$ managing access to volumes $102_1$, $102_2$, $102_3$ . . . $102_N$ of extents $104_1$, $104_2$, $104_3$ . . . $104_N$ configured in storages $106_1$, $106_2$, $106_3$ . . . $106_N$. Host systems 108 perform read and write operations with respect to the volumes $102_1$, $102_2$, $102_3$ . . . $102_N$ over a network 110. Extents $104_1$, $104_2$, $104_3$ . . . $104_N$ comprise groupings of tracks, blocks or other data units assigned to volumes $102_1$, $102_2$, $102_3$ . . . $102_N$.

The host 108 includes a copy manager program $112_H$ to generate requests to establish point-in-time copies of source data in one of the volumes $102_1$, $102_2$, $102_3$ . . . $102_N$ to target data in another of the volumes $102_1$, $102_2$, $102_3$ . . . $102_N$ by submitting a point-in-time copy establish request to the servers $100_1$, $100_2$, $100_3$ . . . $100_N$. The point-in-time copies are defined in copy relationships 300 maintained in the host 106 and servers $100_1$, $100_2$, $100_3$ . . . $100_N$.

Figure 2:
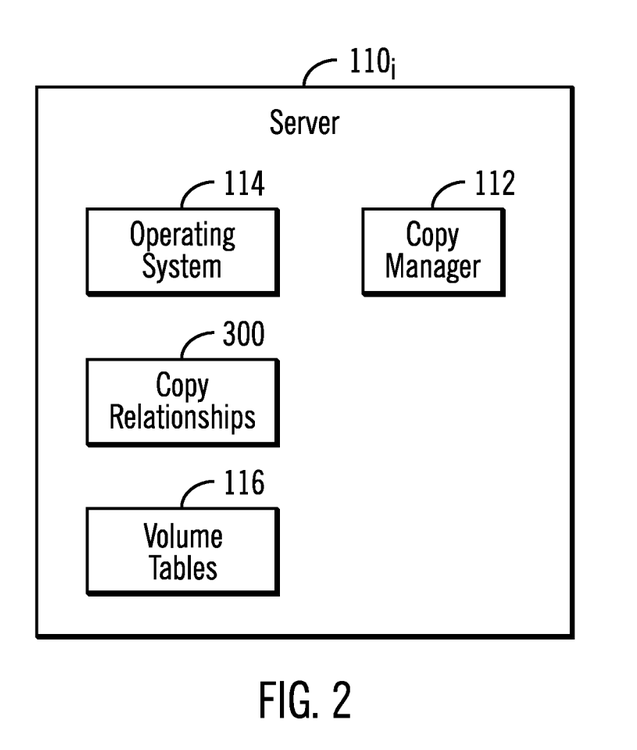
FIG. 2 illustrates an embodiment of components in a storage server.

FIG. 2 shows the components included in each of the servers $100_1$, $100_2$, $100_3$ . . . $100_N$, including an operating system 114 and point-in-time copy managers 112 to create and manage point-in-time copies, e.g., FlashCopy, snapshot, etc., in response to PiT copy establish requests from the host system 108 copy manager $112_H$ When creating a PiT copy, the server copy manager 112 generates copy relationships 300 having information on the PiT copy created as of a point-in-time. In one embodiment, when creating a point-in-time copy relationship to copy data form a source volume $102_S$, managed by a source server $100_S$, to a target volume $102_T$, managed by a target server $100_T$, the source copy manager $112_S$, in the source server $100_S$, and the target copy manager $112_T$ in the target $100_T$ server may each create source $300_S$ and target $300_S$ copy relationships having information on the copy relationship between the source $102_S$ and target $102_T$ volumes.

The operating system 114 in the servers $100_1$, $100_2$, $100_3$ . . . $100_N$ assigns extents of tracks in the storage $106_1$, $106_2$, $106_3$ . . . $106_N$ to the volumes $102_1$, $102_2$, $102_3$ . . . $102_N$, where data is stored in data units, such as tracks, logical block addresses (LBAs), extents, etc. An extent comprises a grouping of tracks, blocks or other data units that is assigned to volumes $102_1$, $102_2$, $102_3$ . . . $102_N$. The operating system 114 maintain volume tables 116 providing information on the configured volumes $102_1$, $102_2$, $102_3$ . . . $102_N$. The operating system 114 further manages I/O requests from the host systems 108 with respect to the volumes $102_1$, $102_2$, $102_3$ . . . $102_N$.

The storages $106_1$, $106_2$, $106_3$ . . . $106_N$ may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes $102_S$, $102_T$ may further be configured from an array of devices, such as Just a Bunch of Disks (JBOD), Direct Access Storage Device (DASD), Redundant Array of Independent Disks (RAID) array, virtualization device, etc. Further, the storages $106_1$, $106_2$, $106_3$ . . . 106N may comprise heterogeneous storage devices from different vendors and different types of storage devices, such as a first type of storage devices, e.g., hard disk drives, that have a slower data transfer rate than a second type of storage devices, e.g., SSDs.

The network 110 may comprise a network such as one or more interconnected Local Area Networks (LAN), Storage Area Networks (SAN), Wide Area Network (WAN), peer-to-peer network, wireless network, etc.

Figure 3:
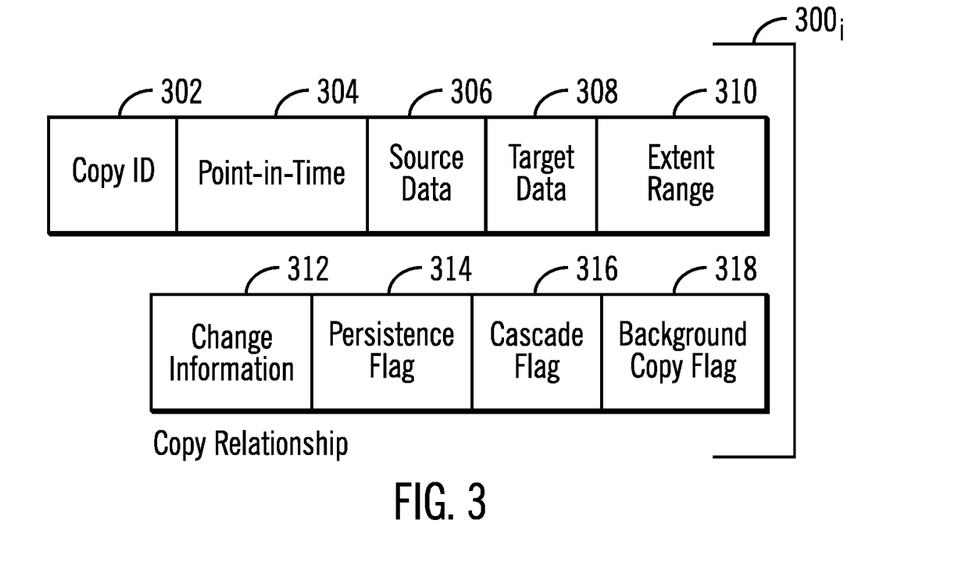
FIG. 3 illustrates an embodiment of a copy relationship.

FIG. 3 illustrates an instance of a copy relationship $300_i$, such as a source and target copy relationship for a source and target pair in a copy relationship, which may include a PiT copy identifier 302 identifying the copy relationship created by the source $112_S$ and target $112_T$ copy managers; a point-in-time 304 of the PiT copy 302, such that data is consistent as of that point-in-time 304; source data 306, e.g., source volume $102_S$, at a source server $100_S$, from which data is copied; target data 308, e.g., target volume $102_T$, at a target server $100_T$ to which the PiT data is copied; an extent range 310 indicating an entire volume $102_S$ or a range of extents from a start track in a volume $102_S$ comprising the source data in the volume $102_S$; change information 312, such as a change recording bitmap, indicating whether each data unit (e.g., track) in the source data 306 has or has not yet been copied to the target data 308; a persistence flag 314 indicating whether the copy relationship $300_i$ is to be retained or persistent after a background copy operation for the copy relationship $300_i$ has completed; a cascade flag 316 indicating whether there is a backward copy relationship $300_B$ having target data that is the source data 306 of the copy relationship $300_i$ that has a pending uncompleted background copy operation of the source data to the target data; and a background copy flag 318 indicating whether a background copy operation is to copy the source data 306 to the target data 308 in the background. The background copy flag 318 is set to indicate no pending background copy operation after completing a background copy operation or if there is no background copy operation to perform.

Figure 4:
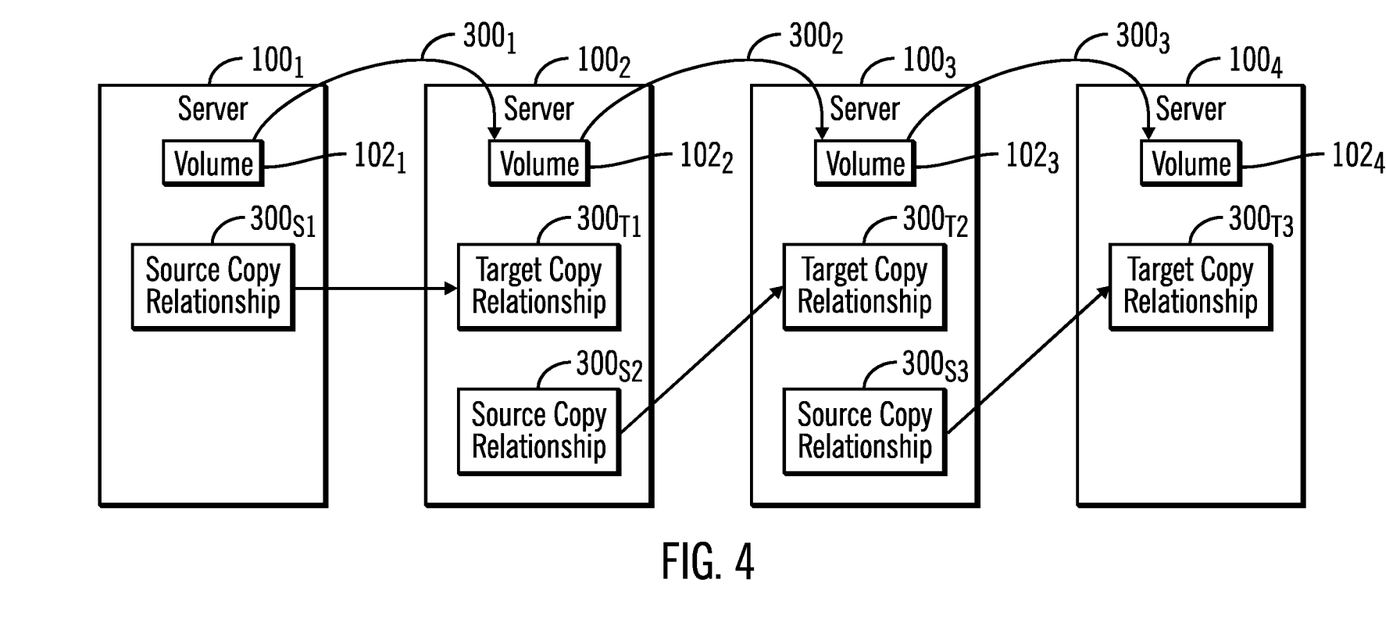
FIG. 4 illustrates an example of cascaded copy relationships established among storage servers.

FIG. 4 illustrates an example of backward and forward copy relationships $300_i$ in a cascade of copy relationships. Each copy relationship $300_i$ may have a source copy relationship $300_{S,i}$ maintained at the source server $100_S$ managing the source volume $102_S$ of the relationship $300_i$ and a target copy relationship $300_{T,i}$ maintained at the target server $100_T$ managing the target volume $102_T$ of the relationship $300_i$. For copy relationship $300_1$, server $100_1$ maintains a source copy relationship $300_{S,1}$ for copy relationship $300_1$ to copy source volume $102_1$ to target volume $102_2$, and server $100_2$ has the target copy relationship $300_{T,1}$ for copy relationship $300_1$. Since the volume $102_2$ comprises a target volume of copy relationship $300_1$ and a source volume for copy relationship $300_2$, copy relationship $300_1$ comprises a backward copy relationship to copy relationship $300_2$. For copy relationship $300_2$, server $100_2$ maintains a source copy relationship $300_{S,2}$ for copy relationship $300_2$ to copy source volume $102_2$ to target volume $102_3$, and server $100_3$ has the target copy relationship $300_{T,2}$ for copy relationship $300_2$. Since the volume $102_3$ comprises a target volume of copy relationship $300_2$ and a source volume for copy relationship $300_3$, copy relationship $300_2$ comprises a backward copy relationship to copy relationship $300_3$. For copy relationship $300_3$, server $100_3$ maintains a source copy relationship $300_{S,3}$ for copy relationship $300_3$ to copy source volume $102_3$ to target volume $102_4$, and server $100_4$ has the target copy relationship $300_{T,3}$ for copy relationship $300_3$. Copy relationships $300_2$, $300_3$, and $300_4$ comprise forward copy relationships to backward copy relationships $300_1$, $300_2$, and $300_3$, respectively.

Figure 5:
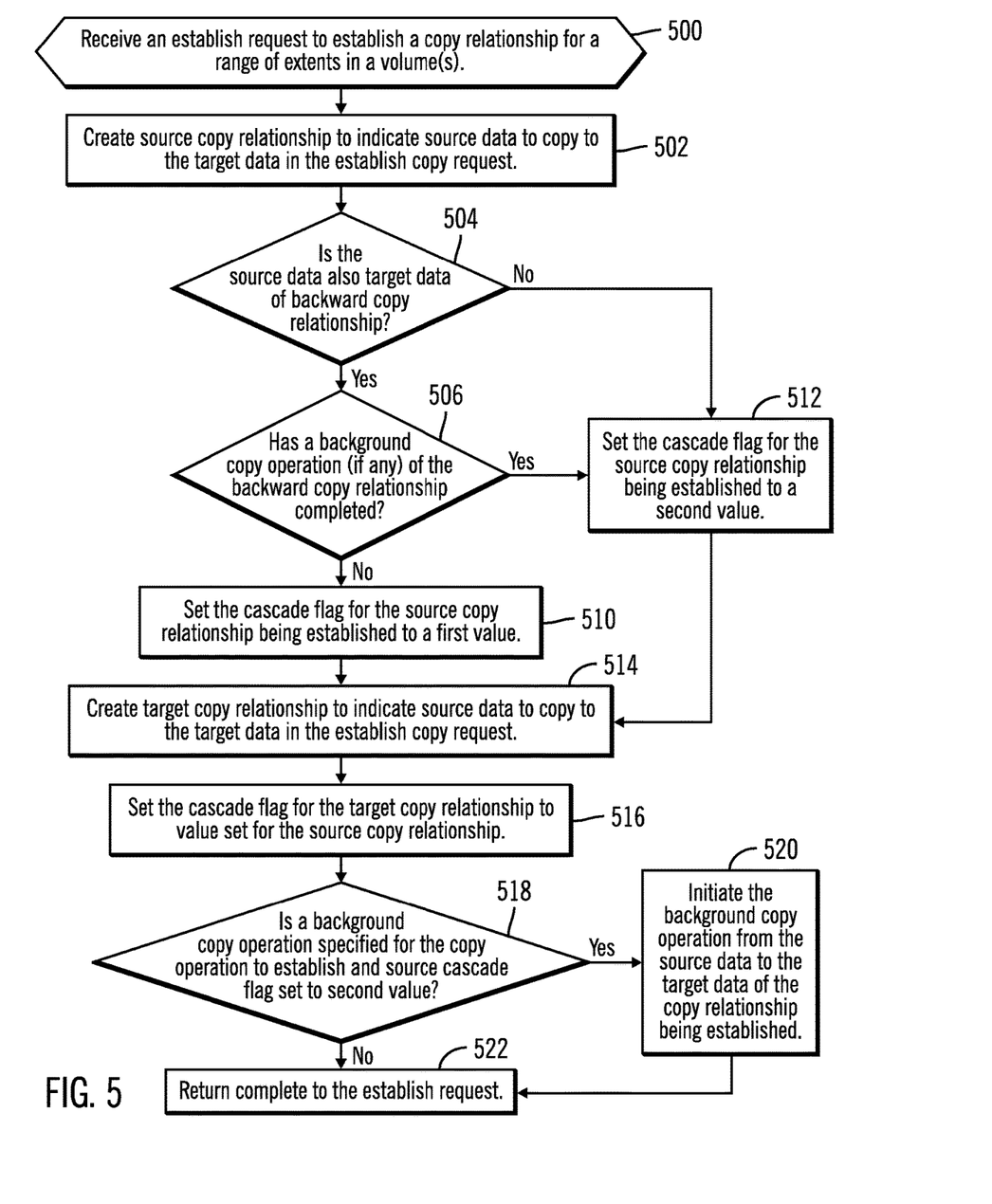
FIG. 5 illustrates an embodiment of operations to establish a point-in-time copy relationship.

FIG. 5 illustrates an embodiment of operations performed by the copy managers 112 in a source server $100_S$ and target server $100_T$ of a copy relationship $300_i$. Upon receiving (at block 500), from the host copy manager $112_H$, an establish request to establish a copy relationship $300_i$ for a range of extents in a source volume $102_S$ to copy to a target volume $102_T$, a server $100_S$ executing a copy manager 112 creates (at block 502) source copy relationship $300_{S,i}$, for new copy relationship $300_i$, to indicate source data, e.g., a source volume $102_S$, to copy to the target data, e.g., target volume $102_T$, in the establish copy request. The source copy manager 112 determines whether the source data is also target data in a backward copy relationship $300_B$. If so, then the source copy manager $112_S$ determines (at block 506) whether the backward target copy relationship $300_{T,B}$ for the target data, e.g., target volume $102_T$, indicates in background copy field 318 whether a background operation is pending or is not pending, such as completed. If there is a pending background copy operations, as indicated in background copy field 318, that has not completed, then the source copy manager 112 sets (at block 510) the cascade flag 316 for the source copy relationship $300_{S,i}$ being created to a first value indicating that the backward copy relationship $300_B$ has not completed its background copy operation.

If (from the no branch of block 504) there is no backward copy relationship for the copy relationship being established or if (from the yes branch of block 506) a background copy relationship is indicated in field 318 as background completed or not specified, then the cascade flag 316 for the source copy relationship $300_{S,i}$ being established is set (at block 512) to a second value indicating there is no pending background copy operation for the backward copy relationship $300_B$ to complete.

After setting the cascade flag at block 510 or 512, a target copy relationship $300_{T,i}$ is created (at block 514), by the copy manager 112 at the target server $100_T$, indicating the source data 306 to copy to the target data 308, and the cascade flag 316 for the target copy relationship $300_T$ is set (at block 516) to the value set for the cascade flag 316 in the source copy relationship $300_S$ at block 510 or 512. The server copy manager $112_S$ may send a message to the target copy manager $112_T$ to perform the operations at block 514 and 516 for the target copy relationship $300_T$ maintained for the target volume $102_T$.

If (at block 518) there is a background copy operation specified for the copy relationship to establish and the source cascade flag is set to the second value, indicating that there is no pending background copy operation for the backward copy relationship to complete, then the source copy manager $112_S$ in the source server $100_S$ initiates (at block 520) the background copy operation from the source data to the target data of the copy relationship being established. The source copy manager $112_S$ in the source server $100_S$ returns (at block 522) complete to the establish request after determining whether a background copy operation should be initiated for the copy relationship being created.

With the described operations of FIG. 5, a background copy operation to copy source data to target data for a copy relationship to establish will not be initiated if a backward copy relationship has not completed its background copy operation. This insures that any updates to the source data of the copy relationship to establish will be completed by the backward copy relationship before the source data of the copy relationship to establish is copied, to make sure the correct data is being transferred to the target data of the copy relationship being established.

Figure 6:
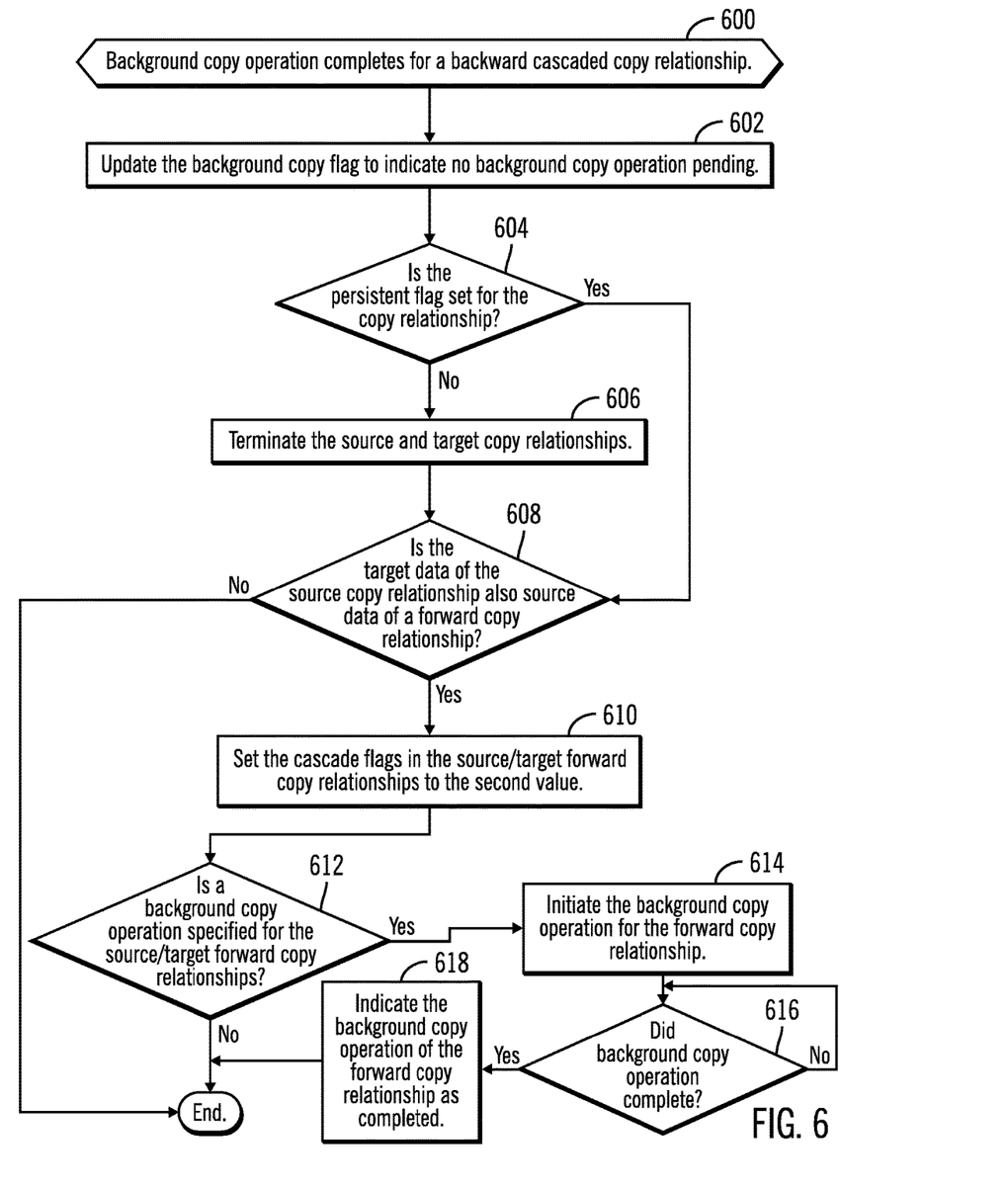
FIG. 6 illustrates an embodiment of operations to process a background copy operation that completes for a backward cascaded copy relationship.

FIG. 6 illustrates an embodiment of operations performed by a copy manager 112 in a server $100_i$ upon completing a background copy operation from the source data 306 to the target data 308 and to reset the cascade flag if the copy relationship $300_i$ for which the background copy operation completed is a backward copy relationship to a forward copy relationship. Upon the background copy operation completing (at block 600) for a copy relationship $300_i$, the copy manager 112, at the source server $100_S$ of the copy relationship $300_i$, updates (at block 602) the background copy flag 318 in the source copy relationship $300_{S,i}$ on the source server $100_S$. The source copy manager $112_S$ may send a message to the target copy manager $112_T$ on the target server $100_T$ to update the background copy flag 318 in target copy relationship $300_{T,i}$. If (at block 604) the persistence flag 314 of the copy relationship $300_i$ indicates that the copy relationship $300_i$ is not to be retained, then the source $300_{S,i}$ and target $300_{T,i}$ copy relationships are terminated (at block 606). The copy manager 112 on the source server $100i$ would remove the source copy relationship $300_{S,i}$ and then send a message to the copy manager 112 on the target server $100_j$ to delete the target copy relationship $300_{T,i}$.

After processing the completing of the background copy operation, if (at block 608) the target data 308 of the backward copy relationship $300_B$ is source data 306 of a forward copy relationship $300_F$, then the cascade flags 316 in the source $300_{S,F}$ and target $300_{T,F}$ forward copy relationships are set (at block 610) to the second value, indicating that the background copy operation for the backward copy relationship $300_B$ completed. In one embodiment, the target copy manager 112 in the target server $100_{T,B}$ of the backward copy relationship, upon receiving a message from the source copy manager 112 in the source server $100_{S,B}$ of the backward copy relationship $300_B$, may send a message to the source server $100_{S,F}$ of the forward copy relationship $300_F$ to update the cascade flag 316 in the source copy relationship $300_{S,F}$, and the copy manager 112 in the source server $100_{S,F}$ may send a message to the target server $100_{T,F}$ of the forward copy relationship $300_F$ to update the cascade flag 316 in the target copy relationship $300_{T,F}$ of the forward copy relationship $300_F$.

Upon updating the cascade flag 316 (at block 610), the copy manager 112 in the source server $100_{S,F}$ of the forward copy relationship $300_F$ determines (at block 612) whether there is a background copy operation, as indicated in field 318, specified for the forward copy relationship $300_F$ in the source copy relationship $300_{S,F}$. If (at block 612) a background copy operation is specified, then the copy manager 112 on the source server $100_{S,F}$ of the forward copy relationship $300_F$ initiates (at block 614) the background copy operation to the target data 308, e.g., target volume $102_1$, in the target server $102_1$. Upon the background copy operation completing (at block 616), the background copy operation field 318 in the source $300_{S,F}$ and target $300_{T,F}$ copy relationships is indicated as completed (at block 618). In one embodiment, the copy manager 112 in the source server $100_{S,F}$ may update the background copy flag 318 in the source copy relationship $300_{S,F}$ of the forward copy relationship $300_F$ upon completing the background copy operation and then send a message the copy manager 112 in the target server $100_{T,F}$ to update the target copy relationship $300_{T,F}$ of the forward copy relationship $300_F$ to update its background copy flag 318. Completing the background copy operation on the forward copy relationship $300_F$ would trigger the target server $100_{T,F}$ copy manager to start the operations at block 600 to process the background copy operation and determine if there are any further forward copy relationships having source data comprising the target data of the forward copy relationship $300_F$ for which the background copy operation completed.

The operations of FIG. 6 provide operations for the copy managers in the servers having the source and target copy relationships to update cascade flags to indicate that a background copy operation for a backward copy relation completed, which then allows the forward copy relationship to complete its background copy operation. This ensures that when a background copy operation is performed for a copy operation having a backward copy relationship, all the data from the backward copy relationships are available at the source data for the background copy operation of the forward copy relationship.

Figure 7:
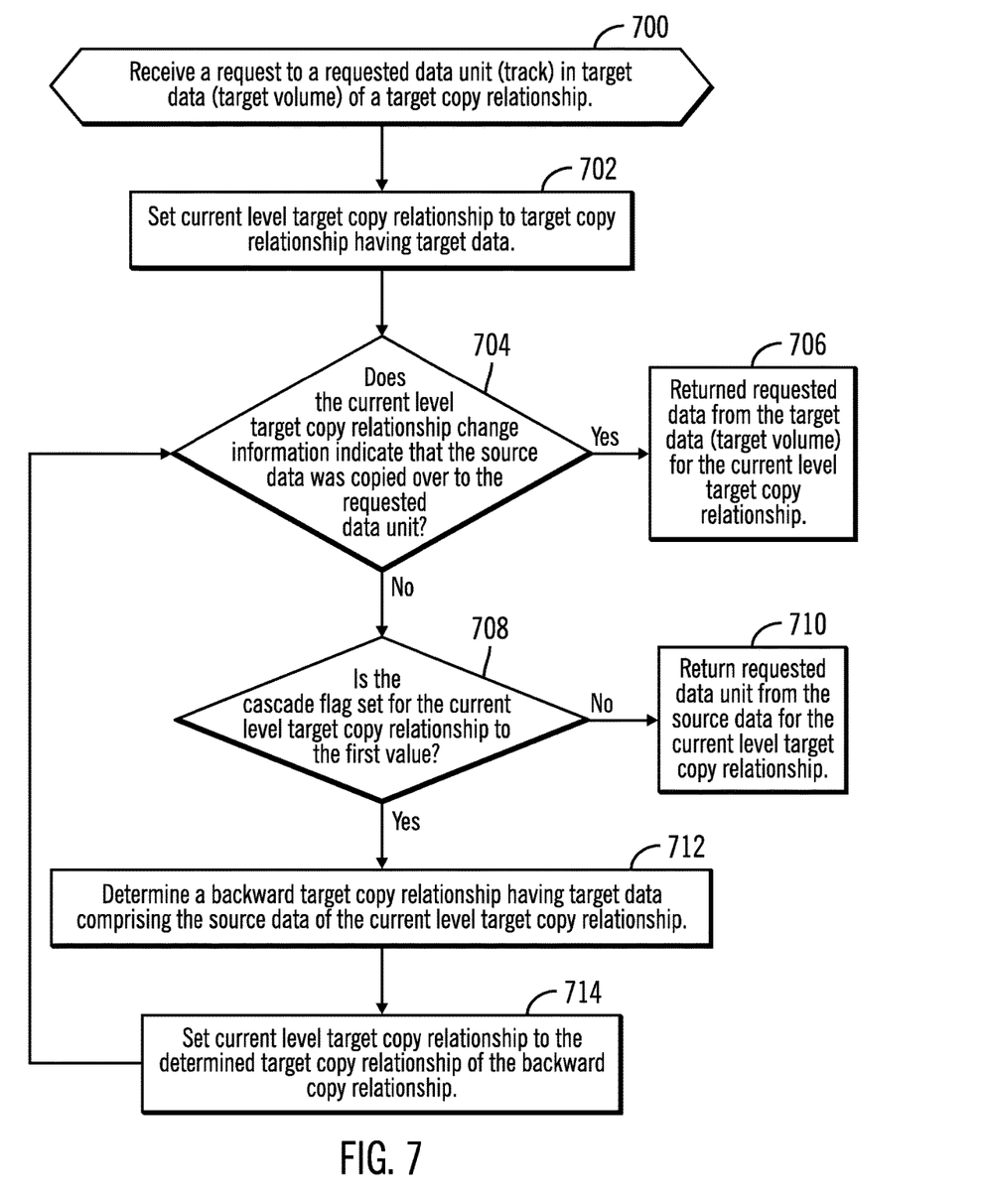
FIG. 7 illustrates an embodiment of operations to process a request to a data unit in target data of a target copy relationship having a backward cascaded copy relationship.

FIG. 7 illustrates an embodiment of operations performed by a copy manager 112 in a target server $100_i$ to process a request for a data unit, e.g., track, in target data, e.g., a target volume $102_i$, of a target copy relationship $300_{T,i}$. Upon receiving (at block 700) the request for the requested data unit, a current level target copy relationship is set (at block 702) to the target copy relationship $300_{T,i}$ having the target data to which the request is directed. If (at block 704) the current level target copy relationship change information 312 indicates that the source data was copied over to the requested data unit in the target storage 308, then the requested data is returned (at block 706) from the target data for the current level copy relationship. If (at block 704) the change information 312 for the current level target copy relationship indicates that the source data has not yet been copied to the target data for the requested data unit, then a determination is made if (at block 708) the cascade flag 316 set for the current level target copy relationship is set to the first value, indicating a backward cascade copy relationship to the current level target copy relationship has not completed its background copy operation. If (at block 708) the cascade flag 316 indicates that the backward copy relationship does not have an uncompleted background copy operation (e.g., the second value), then the requested data is returned (at block 710) from the source data 306 for the current level target copy relationship.

In one embodiment, the copy manager 112 in the target server $100_i$ that received the request may directly read the requested data from the target or source volume at blocks 706 and 710 upon determining the current data for the requested data unit is at the target data or source data. By returning requested data directly from the source data for a current level target relationship, the copy manager 112 on the target server $100_i$ avoids having to send messages to the source server $100_j$ to inquire about the status of the source data, but instead may directly read the source data from the backward copy relationship.

If (at block 708) the backward copy relationship has a pending uncompleted background copy operation to perform (e.g., the first value), a determination is made (at block 712) of a backward target copy relationship having target data comprising the source data 306 of the current level target copy relationship and sets (at block 714) the current level target copy relationship to the determined target copy relationship of the backward copy relationship to determine whether the current data for the requested data unit is available at the backward copy relationship.

In certain embodiments, the copy manager 112 in the target server $100_i$ that received the request may send message to the source server of the current level target copy relationship to determine whether there is a backward target copy relationship at the source server for the source data. This allows one copy manager 112 to either query servers to determine whether they have a backward cascade relationship to further consider or directly access the data unit from a source or target volume in the backward copy relationship in the cascade.

The operations of FIG. 7 optimize the determination of the location of the data by using a cascade flag 316 to determine whether the data of the requested data unit is located in a backward copy relationship that has not yet completed its background copy operation, and then based on that determination locate the data for the requested data unit in the source or target data of the backward copy relationship or a further down level backward copy relationship.

In certain embodiments, each source and target data may comprise a source volume and target volume on different storages managed by different servers, where each server maintains source and/or target copy relationship information to manage the copy relationships. In such embodiments messages need to be sent to a server at which source or target copy relationship information is maintained for volumes managed by the server to perform operations with respect to the copy relationships. In alternative embodiments, source and target copy relationships and source and target volumes for one copy relationship may be maintained at one server, as opposed to separate servers.

The reference characters used herein, such as i, j, N are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
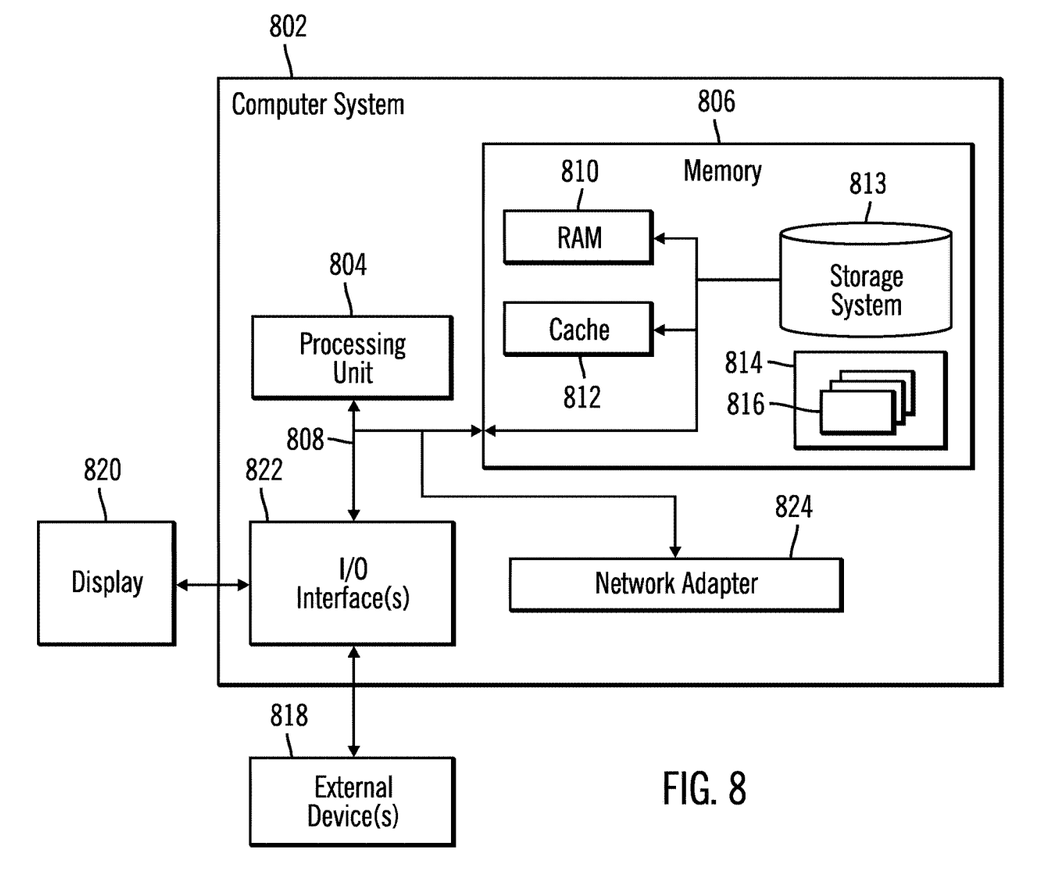
FIG. 8 illustrates a computing environment in which the components of FIG. 1 may be implemented.

The computational components of FIG. 1, including the host 108 and the servers $100_1, 100_2, 100_3 \ldots 100_N$ may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing copy relationships of data in at least one storage, wherein the computer program product comprises a computer readable storage medium having program instructions embodied therewith, the program instructions executable by a processor to cause operations, the operations comprising:
 maintaining information for a plurality of copy relationships, wherein each of the copy relationships indicates to copy source data to target data;
 maintaining a cascade flag for each of the copy relationships;
 setting the cascade flag for a forward copy relationship of the copy relationships to a first value in response to determining that the source data for the forward copy relationship comprises target data for a backward copy relationship and that a background copy operation specified to copy source data to target data of the backward copy relationship has not completed; and
 setting the cascade flag for the forward copy relationship to a second value in response to determining that the backward copy relationship does not have an uncompleted background copy operation.

2. The computer program product of claim 1, wherein source data of at least one backward copy relationship comprises target data of a further level backward copy relationship.

3. The computer program product of claim 1, wherein the operations further comprise:
 processing an establish request to create a new copy relationship to copy source data in one of the at least one storage to target data in one of the at least one storage; and determining whether the source data of the new copy relationship to establish comprises target data of a backward copy relationship copying source data to the target data; and determining whether a background copy operation for the backward copy relationship has completed, wherein the cascade flag for the new copy relationship is set to the first value or the second value depending on the determination with respect to the background copy operation for the backward copy relationship of the new copy relationship to establish.

4. The computer program product of claim 3, wherein the processing the establish request to create the new copy relationship further comprise:

delaying processing a background copy operation for the new copy relationship in response to the cascade flag of the new copy relationship being set to the first value.

5. The computer program product of claim 3, wherein the operations further comprise:

determining whether the establish request for the new copy relationship specifies a background copy operation to copy the source data to the target data of the new copy relationship; and starting the background copy operation for the new copy relationship in response to the cascade flag for the new copy relationship being set to the second value.

6. The computer program product of claim 1, wherein the operations further comprise:

in response to completing the background copy operation for the backward copy relationship, performing:

setting the cascade flag for the forward copy relationship of the backward copy relationship to the second value indicating that the background copy operation for the backward copy relationship completed; and initiating the background copy operation for the forward copy relationship to copy the source data to the target data for the forward copy relationship.

7. The computer program product of claim 1, wherein the at least one storage comprises a first storage, a second storage, and a third storage, wherein the source data of the backward copy relationship comprises all or a portion of a first volume configured in the first storage, wherein the target data of the backward copy relationship also comprising the source data of the forward copy relationship comprises all or a portion of a second volume configured in the second storage, and wherein the target data of the forward copy relationship comprises all or a portion of a third volume configured in a third storage.

8. The computer program product of claim 1, wherein the operations further comprise:

receiving a request to a requested data unit in at least one of the storages;

determining that the requested data unit is part of target data in a determined copy relationship;

determining whether a cascade flag for the determined copy relationship is set to the first value or the second value in response to determining that source data of the determined copy relationship for the requested data unit has not been copied to the target data; and returning data for the requested data unit from the source data of the determined copy relationship in response to determining that the cascade flag is set to the second value.

9. The computer program product of claim 8, wherein the cascade flag comprises a first cascade flag, wherein the operations further comprise:

determining a backward copy relationship having target data that comprises the source data of the determined copy relationship;

determining whether a second cascade flag for the backward copy relationship to the determined copy relationship is set to the first value or the second value; and returning data for the requested data unit from the source data of the backward copy relationship to the determined copy relationship in response to determining that the second cascade flag is set to the second value.

10. The computer program product of claim 9, wherein the operations further comprise:

performing an additional iteration of the operations of determining the backward copy relationship, determining a cascade flag for the backward copy relationship, and returning the data from the source data of the backward copy relationship in response to determining that the cascade flag of the backward copy relationship is set to the first value.

11. The computer program product of claim 1, wherein the cascade flag for each of the copy relationships comprises a source cascade flag, wherein for each of the copy relationships there is a source copy relationship having the source cascade flag and a target copy relationship having a target cascade flag, wherein the target cascade flag for one of the copy relationships is set to the source cascade flag.

12. A system for managing copy relationships of data in at least one storage, comprising:

a processor; and a computer readable storage medium having program instructions executed by the processor to cause operations, the operations comprising:

maintaining information for a plurality of copy relationships, wherein each of the copy relationships indicates to copy source data to target data;

maintaining a cascade flag for each of the copy relationships;

setting the cascade flag for a forward copy relationship of the copy relationships to a first value in response to determining that the source data for the forward copy relationship comprises target data for a backward copy relationship and that a background copy operation specified to copy source data to target data of the backward copy relationship has not completed; and setting the cascade flag for the forward copy relationship to a second value in response to determining that the backward copy relationship does not have an uncompleted background copy operation.

13. The system of claim 12, wherein the operations further comprise:

processing an establish request to create a new copy relationship to copy source data in one of the at least one storage to target data in one of the at least one storage; and determining whether the source data of the new copy relationship to establish comprises target data of a backward copy relationship copying source data to the target data; and determining whether a background copy operation for the backward copy relationship has completed, wherein the cascade flag for the new copy relationship is set to the first value or the second value depending on the determination with respect to the background copy operation for the backward copy relationship of the new copy relationship to establish.

14. The system of claim 13, wherein the processing the establish request to create the new copy relationship further comprise:
    delaying processing a background copy operation for the new copy relationship in response to the cascade flag of the new copy relationship being set to the first value.

15. The system of claim 12, wherein the operations further comprise:
    in response to completing the background copy operation for the backward copy relationship, performing:
        setting the cascade flag for the forward copy relationship of the backward copy relationship to the second value indicating that the background copy operation for the backward copy relationship completed; and
        initiating the background copy operation for the forward copy relationship to copy the source data to the target data for the forward copy relationship.

16. The system of claim 12, wherein the operations further comprise:
    receiving a request to a requested data unit in at least one of the storages;
    determining that the requested data unit is part of target data in a determined copy relationship;
    determining whether a cascade flag for the determined copy relationship is set to the first value or the second value in response to determining that source data of the determined copy relationship for the requested data unit has not been copied to the target data; and
    returning data for the requested data unit from the source data of the determined copy relationship in response to determining that the cascade flag is set to the second value.

17. The system of claim 16, wherein the cascade flag comprises a first cascade flag, wherein the operations further comprise:
    determining a backward copy relationship having target data that comprises the source data of the determined copy relationship;
    determining whether a second cascade flag for the backward copy relationship to the determined copy relationship is set to the first value or the second value; and
    returning data for the requested data unit from the source data of the backward copy relationship to the determined copy relationship in response to determining that the second cascade flag is set to the second value.

18. A method for managing copy relationships of data in at least one storage, comprising:
    maintaining information for a plurality of copy relationships, wherein each of the copy relationships indicates to copy source data to target data;
    maintaining a cascade flag for each of the copy relationships;
    setting the cascade flag for a forward copy relationship of the copy relationships to a first value in response to determining that the source data for the forward copy relationship comprises target data for a backward copy relationship and that a background copy operation specified to copy source data to target data of the backward copy relationship has not completed; and
    setting the cascade flag for the forward copy relationship to a second value in response to determining that the backward copy relationship does not have an uncompleted background copy operation.

19. The method of claim 18, further comprising:
    processing an establish request to create a new copy relationship to copy source data in one of the at least one storage to target data in one of the at least one storage; and
    determining whether the source data of the new copy relationship to establish comprises target data of a backward copy relationship copying source data to the target data; and
    determining whether a background copy operation for the backward copy relationship has completed, wherein the cascade flag for the new copy relationship is set to the first value or the second value depending on the determination with respect to the background copy operation for the backward copy relationship of the new copy relationship to establish.

20. The method of claim 19, wherein the processing the establish request to create the new copy relationship further comprise:
    delaying processing a background copy operation for the new copy relationship in response to the cascade flag of the new copy relationship being set to the first value.

21. The method of claim 18, further comprising:
    in response to completing the background copy operation for the backward copy relationship, performing:
        setting the cascade flag for the forward copy relationship of the backward copy relationship to the second value indicating that the background copy operation for the backward copy relationship completed; and
        initiating the background copy operation for the forward copy relationship to copy the source data to the target data for the forward copy relationship.

22. The method of claim 18, further comprising:
    receiving a request to a requested data unit in at least one of the storages;
    determining that the requested data unit is part of target data in a determined copy relationship;
    determining whether a cascade flag for the determined copy relationship is set to the first value or the second value in response to determining that source data of the determined copy relationship for the requested data unit has not been copied to the target data; and
    returning data for the requested data unit from the source data of the determined copy relationship in response to determining that the cascade flag is set to the second value.

23. The method of claim 22, wherein the cascade flag comprises a first cascade flag, further comprising:
    determining a backward copy relationship having target data that comprises the source data of the determined copy relationship;
    determining whether a second cascade flag for the backward copy relationship to the determined copy relationship is set to the first value or the second value; and
    returning data for the requested data unit from the source data of the backward copy relationship to the determined copy relationship in response to determining that the second cascade flag is set to the second value.

* * * * *